Patented Jan. 4, 1944

2,338,463

UNITED STATES PATENT OFFICE 2,338,463

PROCESS OF MAKING FILAMENTS CONSISTING OF PURE SILICIC ACID

Franz Skaupy, Berlin-Lichterfelde, and Gustav Weissenberg, Berlin - Mariendorf, Germany; vested in the Alien Property Custodian No Drawing. Application August 18, 1938, Serial No. 225,586. In Germany August 19, 1937

13 Claims. (Cl. 18—54)

This invention relates to the manufacture of filaments consisting of pure silicic acid, more particularly quartz.

Compared with glass filaments, filaments consisting of pure silicic acid, and more particularly those consisting of quartz, excel by their greater resistance to chemical influences and heat. They also excel by their extremely high electrical resistance and, particularly if subsequently vitrified, by their very small di-electric losses.

It is already known to make filaments consisting of pure silicic acid, and particularly quartz, by spinning fused silicic acid or quartz. This method is difficult to perform as it necessitates working at extremely high temperatures, quartz only melting at 1710° C.

According to the present invention filaments consisting of pure silicic acid, particularly quartz, are produced by making an intermediate filament from a compound containing silicic acid which is capable of being spun at considerably lower temperatures, this filament being subsequently freed from substances other than silicic acid by chemical action, whereby a filament consisting of pure silicic acid is obtained. Among the silicates having a base radical, which may be used in the process according to the invention, the alkali metal silicates, such as the so-called water glasses, are most important as they melt at comparatively low temperatures. Instead of fused alkali metal silicates, the aqueous solutions of the alkali metal silicates may also be used.

When employing solutions of alkali metal silicates as the initial material in making the intermediate filaments, perfectly clear solutions freed from all impurities by filtering through a fine mesh cloth may be used, but it has been found to be particularly advantageous to precipitate colloidally a small proportion of the silicic acid by a treatment with carbonic acid or other weak acids. This colloidal silicic acid remains suspended in the solution in a finely distributed state and does not interfere with the spinning operation. If desired, the solution may be separated by centrifuging into a portion rich in silicic acid and one poor in it, the one rich in silicic acid being preferably used in making the intermediate filaments.

It has already been proposed to make filaments from alkali metal silicates, especially from various kinds of water glass. These filaments were subsequently stabilized by means of stabilizing agents. The object of such processes was, however, the production of silicate filaments, and not of filaments consisting of pure silicic acid. Accordingly, the basic constituents not consisting of silicic acid were not dissolved and removed from the filaments first obtained in the course of the known processes.

In order to convert the intermediate filaments into filaments consisting of pure silicic acid, the intermediate filaments are subjected to a treatment with acids, salts of an acid reaction, or other chemical substances reacting chemically with the silicates. This treatment may take place in a bath of liquid, or in the gaseous phase. In the latter case, the products of the conversion of the basic components of the silicates must be removed in a separate operation. A filament consisting of alkali metal silicate may, for example, be treated with gaseous hydrochloric acid or with chlorine, and the sodium chloride may be removed by dissolving or evaporating it, thereby converting the filament into one consisting of pure silicic acid.

For the dissolving operation, water is the first choice, but other inexpensive solvents, such as diluted alcohol, may also be used. If solvents other than water are employed, they are preferably subsequently recovered.

When employing a bath of liquid for removing the basic constituents of the silicates, the so-called wet spinning process may be used, i. e., the solution of alkali metal silicate is spun directly into the acid coagulating bath. In such a case, the intermediate filament of alkali metal silicate is converted into a filament of pure silicic acid in statu nascendi. When spinning by the dry spinning process—using either fused silicates or dissolved silicates—the removal of the basic components is a separate operation performed immediately after the spinning operation.

An intermediate filament spun from fused or dissolved alkali metal silicates requires, in order to be converted into a filament of pure silicic acid, a rather drastic subsequent treatment to remove the basic components completely. In the following description, the removal of the basic components by means of dilute acids is mainly contemplated, but similar principles apply to the modifications of the invention where the dilute acids are replaced by salts having an acid reaction, or by other substances capable of reacting chemically with the basic components of the silicates.

The intensity of the acid treatment required to remove the basic constituents depends, naturally, on the gauge of the filaments. The greater the diameter of the filaments the more intense an acid treatment is required, whereas extremely fine filaments may be completely freed from basic constituents by a comparatively mild treatment with acid.

The three factors: concentration of the acid, temperature and duration of the treatment, are so correlated, that increasing any one of them permits decrease of one or both of the others. Acid concentrations ranging between 5 and 50 per cent are preferred for removing the basic constituents from the filaments, strong mineral acids, such as hydrochloric acid, sulphuric acid, nitric acid, being particularly suitable for the acid treatment. Of the organic acids, the comparatively strong ones such as, e. g., formic acid, oxalic acid, and acetic acid are suitable. Instead of aqueous solutions of acids or salts having an acid reaction, solutions also containing an organic solvent may be used, e. g., aqueous and alcoholic solutions of an acid.

Room temperature or a slightly increased temperature is sufficient, as a rule, for the acid treatment, the duration of the treatment mainly depending upon the gauge of the filaments. With filaments of a medium gauge, e. g., with a diameter of 10 to 20 microns, a treatment with nitric acid of 30 per cent for 10 minutes at room temperature is sufficient.

A modification of the removal of the basic constituents from the intermediate filaments, which is of great practical importance, consists in treating the filaments with comparatively dilute acid in the first instance and with a more concentrated solution later on; if desired, the filaments may also be washed between these steps. To use a weak diluted acid is particularly recommendable when the filaments are directly spun into an acid bath, in accordance with the wet spinning process. In that process, the employment of a more concentrated acid as the coagulating bath would result in the filaments solidifying prematurely, which makes the employment of a more dilute acid desirable, particularly in connection with the stretch-spinning process. The complete removal of the last remnants of the basic constituents is preferably obtained by a subsequent treatment with a more concentrated acid.

Both the dry spinning process and the wet spinning process may be employed in making the intermediate filaments. In accordance with the dry spinning process, the filaments are spun into air, and the conversion of the intermediate filaments into the final silicic acid filaments is brought about subsequently. In accordance with the wet spinning process, the intermediate filaments are spun into a coagulating bath, whereby they are partly converted into silicic acid filaments in statu nascendi. Both processes may be employed when using a fused silicate as well as when using a solution of silicate as the initial material.

Whether the dry spinning process or the wet spinning process is employed, silicic acid filaments are eventually obtained, which consist to a considerable extent, of colloidal or micro-crystalline silicic acid. In the case of the dry-spun filaments, the micro-crystallites are probably unoriented, and distributed at random in the filament, whereas in filaments obtained by the wet-spinning process the micro-crystallites are probably arranged in parallel to the axis of the filament, at least to a certain extent. The extent of orientation is probably increased by the stretch-spinning operation, the more so the more the filaments are stretched. This orientation of the micro-crystallites results in an improvement in the mechanical properties of the filaments, particularly in their extensibility.

The size of the crystallites can be shown to depend largely upon the conditions of formation, particularly upon the pressure and the temperature. The well-known rules regarding the hydrothermal formation of crystals apply. Slowing down the coagulating reaction is particularly inducive to an increased extent of crystalline orientation.

In order to improve the mechanical properties of the silicic acid filaments it may be advisable to vitrify the filaments completely. This is done, in accordance with the invention, by heating the filaments subsequently to a temperature which is high enough to cause vitrification of silicic acid, or of quartz, respectively. In order to avoid the filaments being destroyed by the heat it is, however, necessary to pass the filaments through the heating zone at a high speed. Their thermal capacity being very small, they cool down, after having passed through the heating zone, so quickly that devitrification (formation of crystalline modifications of quartz such as crystoballite) need not be expected. The vitrifying temperature also depends upon whether the filaments consist of colloidal silicic acid, or of quartz (probably $\beta$-quartz), and should be chosen accordingly.

In every case, the duration of the heat treatment depends upon the gauge of the filaments. With filaments having a diameter of 5 microns, it is sufficient to draw them through a narrow, highly heated zone at a rate of 1000 metres per minute. With finer filaments, the speed may be increased still further, whereas with filaments of a larger diameter the speed at which they are drawn through the heating zone has to be reduced.

While the filaments of silicic acid are drawn through the heating zone their diameter may further be reduced by a stretching process.

If the production of coloured filaments is desired, suitable mineral colouring matter may be added to the material to be spun, care being taken to use only such colouring substances which are not removed by the reagents used for treating the intermediate filaments so as to remove the basic constituents of the silicates. By way of example, colloidal metals especially colloidal precious metals, and oxidic compounds of metals or non-metals present in a stage of oxidation other than their highest, may be mentioned as suitable colouring substances.

The invention is further illustrated in the following examples:

Example 1

Commercial water-glass having the composition $1Na_2O$, $3SiO_2$ is fused, and the fused mass is clarified by prolonged heating or by subjecting it to a vacuum. After this, the fused mass is spun through nozzles to form filaments using a drum in accordance with the conventional method of spinning glass, or else by the injector method which is also known, and in which the filament issuing from the nozzle is caught and carried away by a jet of steam or compressed air. The required temperature is below 1000° C., which is a considerable advantage in comparison with the direct spinning of fused quartz. The filament of 2–10$\mu$, which thus has been spun, is treated at room temperature with 50% sulphuric acid for five minutes, and is then washed with care.

Filaments coloured blue are obtained by adding to the fused water-glass some titanium dioxide reduced in a current of hydrogen, and heating until dissolution has taken place.

Example 2

Solid commercial double water-glass, having the composition $1Na_2O, 1K_2O, 6SiO_2$, is dissolved in an excess of water, and the solution is evaporated, preferably in vacuo so as to avoid the undesirable effect of carbon dioxide, until a concentration corresponding to a specific gravity of 60° Baumé is obtained. After de-aerating and filtering, the solution is used for dry-spinning filaments of a diameter ranging between 1 to 10 microns. The alkali is removed by a subsequent treatment, for two minutes, with a 30 per cent nitric acid. After this, the filament is drawn at a speed of 1000 metres per minute through a hydrogen and oxygen or a town gas and oxygen flame, or through an electrically heated zone.

Example 3

Commercial potassium water-glass having the composition $1K_2O, 2SiO_2$, is dissolved in the fivefold quantity of water, and the solution is de-aerated and filtered. It is then spun, by the wet spinning process, into a 5 per cent solution of hydrochloric acid serving as a coagulating bath, and wound by means of spinning centrifuges. The filament cakes are then treated first with a 10 per cent, and later with a 20 per cent, solution of acid, with or without an intermediate washing operation.

In all three examples, the stretch-spinning process is employed, i. e., the diameter of the apertures of the nozzles is ten to hundred times greater than the diameter of the final filament.

We claim:

1. Process of making filaments substantially consisting of pure silicic acid, comprising dissolving a silicate in water, partially precipitating the silicic acid in colloidal form by weak acid, producing from the solution an intermediate filament by spinning at a spinning temperature below that of pure silicic acid, and reducing said intermediate filament to a pure silicic acid filament by treating it with acid substances capable of chemically reacting upon and of removing the base radical from the silicate.

2. Process of making filaments substantially consisting of pure silicic acid, comprising preparing an aqueous solution of a silicate having a base radical and a melting point below that of pure silicic acid, colloidally precipitating part of the silicic acid from said silicate by introducing a weak acid into said soluton, separating said solution by centrifuging into two portions one of which is richer in silicic acid than the other, producing an intermediate filament by spinning at a spinning temperature below that of pure silicic acid said one portion of said solution which is richer in silicic acid, and reducing said intermediate filament to a pure silicic filament by treating it with acid substances capable of chemically removing the base radical from the silicate of the intermediate filament.

3. Process of making silica filaments in which the silicon ingredient is pure silicic acid, comprising producing an intermediate filament by spinning at a spinning temperature below that of pure silicic acid a compound substantially consisting of a base radical and a silicic acid radical and having a correspondingly lower melting point than pure silicic acid, and converting the intermediate filament into a silica filament by vigorously treating it with an acid substance capable of reducing said compound to pure silicic acid.

4. Process like that of claim 3 in which the acid substance used is a liquid acid.

5. Process like that of claim 3 in which the acid substance used is an aqueous acid solution.

6. Process like that of claim 3 in which the acid substance used is an aqueous acid salt solution.

7. Process like that of claim 3 in which the acid substance used is selected from the group consisting of gaseous acids and halogens.

8. Process like that of claim 3 in which the compound substantially making up the intermediate filament is a fused silicate.

9. Process like that of claim 3 in which the compound substantially making up the intermediate filament is a fused alkali metal silicate.

10. Process like that of claim 3 in which the compound substantially making up the intermediate filament is a fused water glass.

11. Process like that of claim 3 in which the compound substantially making up the intermediate filament is an aqueous solution of a silicate.

12. Process like that of claim 3 in which the compound substantially making up the intermediate filament is an aqueous solution of an alkali silicate.

13. Process like that of claim 3 in which the compound substantially making up the intermediate filament is an aqueous solution of water glass.

FRANZ SKAUPY.
GUSTAV WEISSENBERG.